(12) United States Patent
Ionin et al.

(10) Patent No.: US 12,353,757 B2
(45) Date of Patent: Jul. 8, 2025

(54) EXCESS CMB UTILIZATION BY STORAGE CONTROLLER

(71) Applicant: Western Digital Technologies, Inc., San Jose, CA (US)

(72) Inventors: Michael Ionin, Rehovot (IL); Alexander Bazarsky, Holon (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/349,389

(22) Filed: Jul. 10, 2023

(65) Prior Publication Data
US 2024/0377983 A1   Nov. 14, 2024

Related U.S. Application Data

(60) Provisional application No. 63/465,070, filed on May 9, 2023.

(51) Int. Cl.
*G06F 3/06* (2006.01)
(52) U.S. Cl.
CPC .......... *G06F 3/0656* (2013.01); *G06F 3/0604* (2013.01); *G06F 3/0673* (2013.01)
(58) Field of Classification Search
CPC ..... G06F 3/0656; G06F 3/0604; G06F 3/0673
See application file for complete search history.

(56) References Cited

U.S. PATENT DOCUMENTS

| | | | |
|---|---|---|---|
| 10,564,872 B2 | 2/2020 | Benisty | |
| 10,956,344 B2 | 3/2021 | Maroney et al. | |
| 11,334,274 B2 | 5/2022 | Kabra et al. | |
| 11,392,509 B2 | 7/2022 | Xu et al. | |
| 11,409,466 B2 | 8/2022 | Benisty | |
| 11,698,865 B1 * | 7/2023 | Creed | G06F 3/067 711/118 |
| 11,755,219 B1 * | 9/2023 | Vadla | G06F 3/0611 711/154 |
| 2004/0068615 A1 * | 4/2004 | Chaudhari | G06F 13/16 711/137 |
| 2007/0002612 A1 * | 1/2007 | Chang | G06F 3/0679 365/185.01 |

(Continued)

FOREIGN PATENT DOCUMENTS

WO   2019-182654 A1   9/2019

OTHER PUBLICATIONS

International Search Report and Written Opinion for Application No. PCT/US2024/010571 dated May 2, 2024.

*Primary Examiner* — Nanci N Wong
(74) *Attorney, Agent, or Firm* — PATTERSON + SHERIDAN, LLP

(57) ABSTRACT

A controller memory buffer (CMB) is a portion of volatile memory of a controller of a data storage device that is allocated to a host device for use by the host device. When the CMB is not fully utilized, the controller may determine that at least a portion of the unutilized space of the CMB may be used for non-host data. The at least a portion is based on a number of past workloads and a current workload of the CMB. An amount of available space of the CMB that the controller may utilize is dependent on the number of past workloads and the current workload of the CMB. Thus, the volatile memory of the controller may be more optimally utilized.

6 Claims, 6 Drawing Sheets

(56) References Cited

U.S. PATENT DOCUMENTS

| | | | |
|---|---|---|---|
| 2010/0268872 A1 | 10/2010 | Lee et al. | |
| 2014/0237205 A1* | 8/2014 | Takefman | G06F 3/0659 |
| | | | 711/162 |
| 2017/0153843 A1* | 6/2017 | Dewitt | G06F 3/0605 |
| 2018/0150242 A1 | 5/2018 | Yi et al. | |
| 2018/0341606 A1* | 11/2018 | Bolkhovitin | G06F 3/0656 |
| 2019/0065102 A1* | 2/2019 | Shin | G06F 12/0897 |
| 2019/0235790 A1 | 8/2019 | Koo et al. | |
| 2019/0317901 A1* | 10/2019 | Kachare | G06F 3/064 |
| 2020/0210348 A1* | 7/2020 | Byun | G06F 12/122 |
| 2020/0401513 A1* | 12/2020 | He | G06F 12/0253 |
| 2021/0157500 A1* | 5/2021 | Gu | G06F 3/0613 |
| 2022/0269425 A1 | 8/2022 | Sharma et al. | |
| 2023/0153038 A1* | 5/2023 | Yoo | G06F 11/10 |
| | | | 711/114 |
| 2023/0161499 A1* | 5/2023 | Izhar | G06F 3/061 |
| | | | 711/154 |
| 2023/0236758 A1* | 7/2023 | Del Gatto | G06F 3/0656 |
| | | | 711/154 |
| 2023/0315292 A1* | 10/2023 | Nishikubo | G06F 3/0655 |
| 2024/0045726 A1* | 2/2024 | Leach | G06F 9/5083 |

\* cited by examiner

| BITS | TYPE | RESET | DESCRIPTION |
|---|---|---|---|
| 31:12 | RO | IMPL SPEC | SIZE (SZ): INDICATES THE SIZE OF THE CONTROLLER MEMORY BUFFER AVAILABLE FOR USE BY THE HOST. THE SIZE IS IN MULTIPLES OF THE SIZE UNIT. IF THE OFFSET + SIZE EXCEEDS THE LENGTH OF THE INDICATED BAR, THE SIZE AVAILABLE TO THE HOST IS LIMITED BY THE LENGTH OF THE BAR. |
| 11:08 | RO | IMPL SPEC | SIZE UNITS (SZU): INDICATES THE GRANULARITY OF THE SIZE FIELD.<br><br>| VALUE | GRANULARITY |<br>|---|---|<br>| 0h | 4 KiB |<br>| 1h | 64 KiB |<br>| 2h | 1 MiB |<br>| 3h | 16 MiB |<br>| 4h | 256 MiB |<br>| 5h | 4 GiB |<br>| 6h | 64 GiB |<br>| 7h to Fh | Reserved | |

FIG. 2

EXCESS CMB UTILIZATION BY STORAGE CONTROLLER

CROSS-REFERENCE TO RELATED APPLICATIONS

This application claims benefit of U.S. Provisional Patent Application Ser. No. 63/465,070, filed May 9, 2023, which is herein incorporated by reference.

BACKGROUND OF THE DISCLOSURE

Field of the Disclosure

Embodiments of the present disclosure generally relate to data storage devices, such as solid state drives (SSDs), and, more specifically, efficient usage of a volatile memory of a controller of a data storage device.

Description of the Related Art

When a data storage device is booted, a controller may allocate a portion of its volatile memory to a coupled host device as a controller memory buffer (CMB). The portion of volatile memory allocated as the CMB remains constant during the operation of the data storage device. In other words, the size of the CMB does not change until the data storage device is rebooted and a new handshake agreement is set. While the CMB is allocated to the host device, the host device may utilize any amount of the CMB for storage. For example, the host device may utilize all of the CMB for storage. In another example, the host device may utilize less than all of the CMB for storage. In yet another example, the host device may utilize none of the CMB for storage.

However, because the CMB has been allocated to the host device, the controller may not utilize the portion of its volatile memory that has been allocated as the CMB for its own use. Thus, when the CMB is not fully utilized by the host device, the available space of the CMB is not available for use by the controller. In other words, the memory storage space of the volatile memory may not be utilized optimally or efficiently.

Therefore, there is a need in the art for an improved implementation of a CMB.

SUMMARY OF THE DISCLOSURE

The present disclosure generally relates to data storage devices, such as solid state drives (SSDs), and, more specifically, efficient usage of a volatile memory of a controller of a data storage device. A controller memory buffer (CMB) is a portion of volatile memory of a controller of a data storage device that is allocated to a host device for use by the host device. When the CMB is not fully utilized, the controller may determine that at least a portion of the unutilized space of the CMB may be used for non-host data. The at least a portion is based on a number of past workloads and a current workload of the CMB. An amount of available space of the CMB that the controller may utilize is dependent on the number of past workloads and the current workload of the CMB. Thus, the volatile memory of the controller may be more optimally utilized.

In one embodiment, a data storage device includes a memory device and a controller coupled to the memory device. The controller includes a controller memory buffer (CMB) allocated to a host device for use by the host device. The controller is configured to determine a usage pattern of the CMB by the host device and utilize a portion of the CMB for non-host data based on the usage pattern of the CMB by the host device. The portion of the CMB remains allocated to the host device.

In another embodiment, a data storage device includes a memory device and a controller coupled to the memory device. The controller includes a volatile memory device a controller memory buffer (CMB) allocation module. The volatile memory device includes a CMB. The CMB is allocated to a host device for use by the host device. The CMB allocation module is configured to analyze a usage pattern of the CMB, where analyzing the usage pattern of the CMB includes analyzing a number of past workloads of the CMB and a current workload of the CMB, determine whether a portion of the CMB can be used by the controller based on the usage pattern, and notify the controller of the portion of the CMB that can be used by the controller based on the determining. The controller is configured to utilize the portion of the CMB for management data, responsive to the notifying. The portion of the CMB remains allocated to the host device.

In another embodiment, a data storage device includes first means for storing data and a controller coupled to the first means for storing data. The controller includes second means for storing data. The controller is configured to allocate a portion of the second means for storing data to a host device, determine that the host device is using less than all of the portion of the second means for storing data, and utilize the portion of the second means for storing data not used to store management data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table showing a size definition of a CMB, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, efficient usage of a volatile memory of a controller of a data storage device. A controller memory buffer (CMB) is a portion of volatile memory of a controller of a data storage device that is allocated to a host device for use by the host device. When the CMB is not fully utilized, the controller may determine that at least a portion of the unutilized space of the CMB may be used for non-host data. The at least a portion is based on a number of past workloads and a current workload of the CMB. An amount of available space of the CMB that the controller may utilize is dependent on the number of past workloads and the current workload of the CMB. Thus, the volatile memory of the controller may be more optimally utilized.

Figure 1:
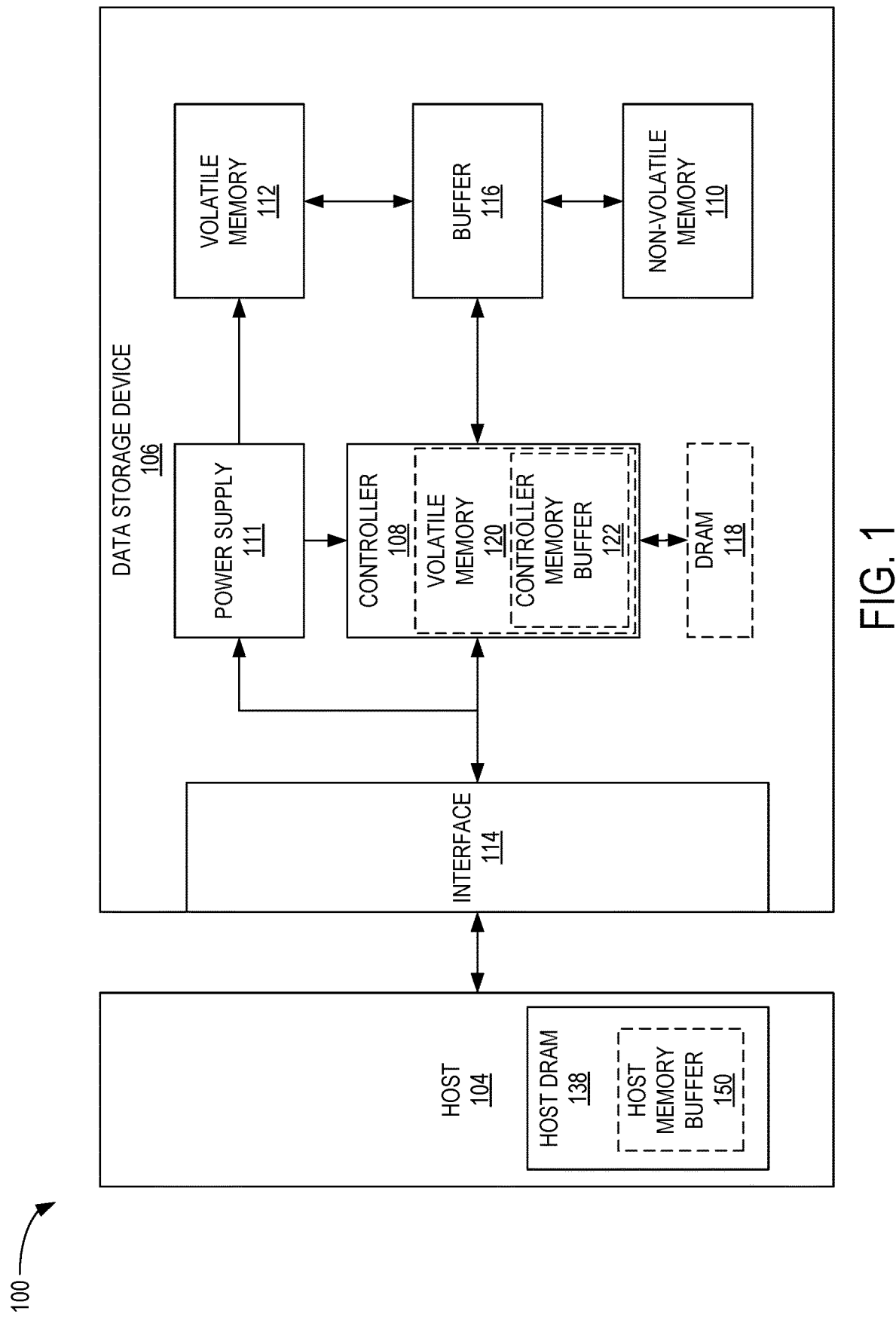
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

FIG. 2 is a table 200 showing a size definition of a CMB, such as the CMB 122 of FIG. 1, according to certain embodiments. The CMB is a region of general purpose read/write memory, which may be SRAM or DRAM, on a controller, such as the controller 108 of FIG. 1. The controller, at boot up, indicates support for the CMB to a host device coupled to the data storage device having the controller by setting the CMB space (CAP.CMBS) value to '1'. The host device indicates intent to use the CMB by setting the CMB memory space create (CMBMSC.CRE) value to '1'. Once the CMBMSC.CRE bit is set to '1', the controller indicates the properties of the CMB via the CMB location (CMBLOC) and the CMB size (CMBSZ) properties.

The CMB may be used for a variety of purposes. The controller indicates which purposes the memory may be used for by setting support flags in the CMBSZ property. The PCIe address range of the CMB is used for external memory read and write requests to the CMB. The PCIe base address of the CMB is defined by the PCI Base Address Register (BAR) indicated by CMB location Base Indicator Register (CMBLOC.BIR), and the offset indicated by CMB location offset (CMBLOC.OFST). The size of the CMB is indicated by CMB size (CMBSZ.SZ). The controller uses the controller address range of the CMB to reference CMB with addresses supplied by the host device. The PCIe address range and the controller address range of the CMB may differ, but both ranges have the same size, and equivalent offsets within each range have a one-to-one correspondence. The host device configures the controller address range of the CMB via the CMB memory space (CMBMSC) property. The host device enables the controller memory space of the CMB via the CMB memory space enable (CMBMSC.CMSE) bit. When controller memory space is enabled and the host device supplies an address referencing the controller address range of the CMB, then the controller directs memory read or write requests associated with the address to the CMB. The CMB may be used by the host device to store submission queues so that the controller can read the addresses directly from the CMB when the read command is issued. Completion queues in the CMB may be used for peer to peer or other applications. For writes of small amounts of data, it may be advantageous to have the host write the data and/or metadata to the CMB rather than have the controller fetch it from host DRAM, such as the host DRAM 138 of FIG. 1.

The controller may support physical region page (PRP) lists and scatter gather lists (SGLs) in the CMB. If the CMB data pointer mixed locations support (CMBLOC.CDPMLS) bit is cleared to '0', then for a particular PRP list or SGL associated with a single command, all memory associated with the PRP list or SGL is either entirely located in the CMB or entirely located outside the CMB. The controller may support data and metadata in the CMB. If the CMB data metadata mixed memory support (CMBLOC.CDMMMS) bit is cleared to '0', then all data and metadata, if any, associated with a particular command is either entirely located in the CMB or entirely located outside the CMB. The address region allocated for the CMB is aligned to 4 KiB. The controller may allocate the CMB on an 8 KiB boundary. The controller may support burst transactions up to the maximum payload size, support byte enables, and arbitrary byte alignment. As shown in table 200, the size of the CMB is indicated by the CMBSZ.SZ bit and is set during the boot by the data storage device. The size of the CMB remains constant during the operation of the data storage device.

Figure 3:
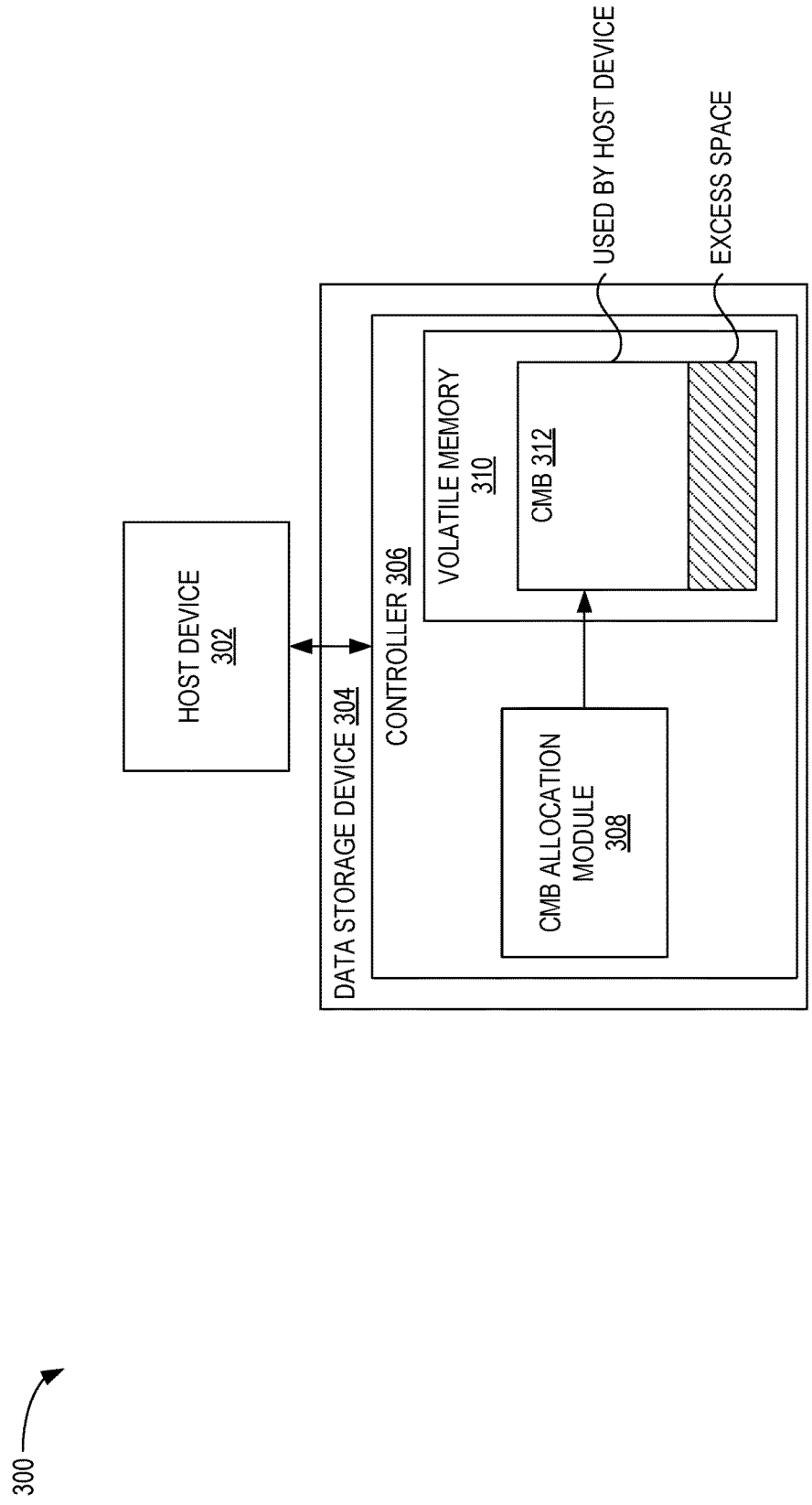
FIG. 3 is a schematic block diagram illustrating a storage system in which a controller of a data storage device includes a CMB allocation module, according to certain embodiments.

FIG. 3 is a schematic block diagram illustrating a storage system 300 in which a controller 306 of a data storage device 304 includes a CMB allocation module 308, according to certain embodiments. Storage system 300 may be the storage system 100 of FIG. 1. Host device 302 is coupled to the data storage device 304. The data storage device 304 includes the controller 306. The controller 306 includes a CMB allocation module 308 and a volatile memory 310. The volatile memory 310 may be the optional second volatile memory 120 of FIG. 1. The volatile memory 310 includes a CMB 312.

The CMB allocation module 308 may be configured to periodically check and store the status of the CMB 312 (e.g., a current workload of the CMB 312). Because the CMB 312 may not be fully utilized by the host device 302, the remaining available space of the CMB 312 (e.g., excess space) may be wasted due to not being utilized. The CMB allocation module 308 may determine, based on the current workload of the CMB 312 and a number of past workloads of the CMB 312, an amount of space of the remaining available space of the CMB 312 that may be utilized by the controller 306 for non-host data. The determining may be based dependent on the current workload, such that only the same or substantially similar workloads of the number of past workloads analyzed are used in the determination. A workload may refer to a number of random reads, a number of random writes, a number of sequential writes, a number of sequential reads, or a combination of the aforementioned examples. Furthermore, it is to be understood that substantially similar may refer to workloads having a same type of workload and/or a same intensity (e.g., number of related commands received in a certain period of time) of workload. In other words, the CMB allocation module 308 may be configured to generate a pattern analysis of past usage profiles under the different workloads, such that a certain amount of space of the CMB 312 is identified as a space that the host device has not used under current and predicted workloads. For example, in some cases, the CMB 312 may be initialized for host device 302 usage, but never used by the host device 302. In other examples, a part of the CMB 312 may be written to and read only once, such that the part of the CMB 312 acts as a queue. After the write operation, the portion is never read until it is written to again.

The CMB allocation module 308 may also be configured to control the size of the CMB 312 as well as manage/change host-controlled addresses dynamically according to usage pattern analysis. The amount of space of the remaining available space of the CMB 312 that may be utilized by the controller 306 for non-host data may be less than the total amount of remaining space of the CMB 312, such that the host device 302 may still write to the remaining space.

The CMB 312 may either be SRAM, DRAM, or both SRAM and DRAM. In examples where the CMB 312 is SRAM, usage examples of the excess space of the CMB 312 may include using the space as a local cache to cache data normally or previously stored outside of the controller 306, increasing a number of read look ahead streams (i.e., caching data that may be read from a memory device of the data storage device 304 within a predetermined number of read requests based on read request ranges received), storing parts of a relink table mapping bad blocks to good blocks, and using the space as additional buffers for garbage collection for higher parallelism. In examples where the CMB 312 is DRAM, usage examples of the excess space of the CMB 312 may include using the space as a cache for data stored in an NVM, such as the NVM 110 of FIG. 1, to simplify existing flows and improve access latency and using the space for exception handling by providing additional buffers for recovery and speeding up the recovery process.

Figure 4:
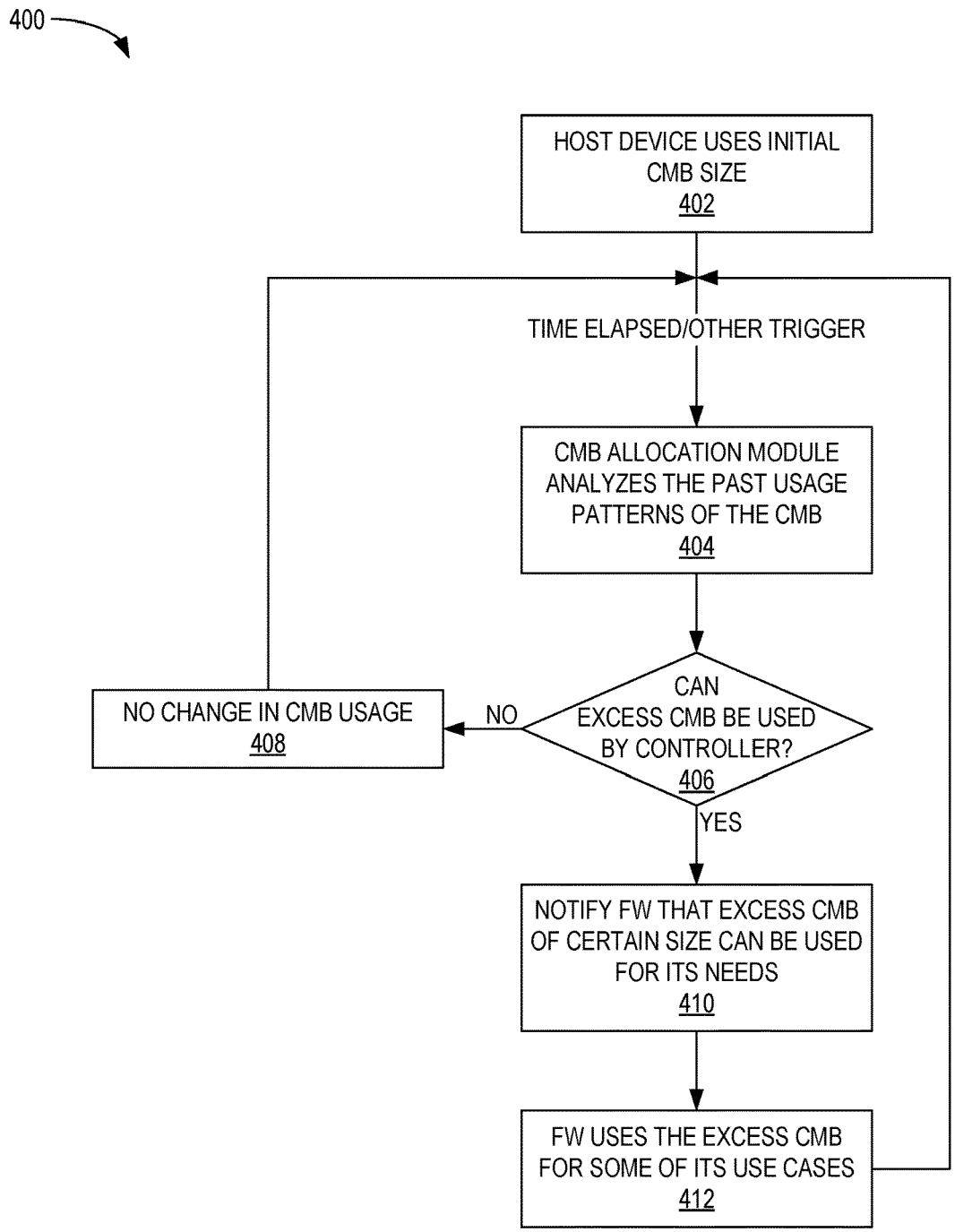
FIG. 4 is a flow diagram illustrating a method of using excess CMB by a controller for non-host data, according to certain embodiments.

FIG. 4 is a flow diagram illustrating a method 400 of using excess CMB by a controller for non-host data, according to certain embodiments. Method 400 may be implemented by a controller, such as the controller 108 of FIG. 1 or the controller 306 of FIG. 3, where the controller includes a CMB allocation module, such as the CMB allocation module 308 of FIG. 3. For exemplary purposes, aspects of the storage system 300 of FIG. 3 may be referenced herein.

At block 402, the host device 302 uses an initial size of the CMB 312. After a period of time has elapsed or some other relevant trigger occurs, such as a change in workload, the CMB allocation module 308 analyzes the past usage patterns of the CMB 312 at block 404. At block 406, the CMB allocation module 308 determines whether the excess space of the CMB 312 can be used by the controller 306 for non-host data based on the current workload and a number of past workloads analyzed. If the excess space of the CMB 312 cannot be used by the controller 306 for non-host data at block 406, then there is no change in the usage of the CMB 312 at block 408. However, if the excess space of the CMB can be used by the controller 306 for non-host data at block 406, then the controller 306 (e.g., the firmware (FW)) is notified that the excess space in the CMB 312 of a certain size (which may be less than the total amount of excess space) can be used for non-host data by the controller 306 at block 410. At block 412, the controller 306 utilizes the excess CMB for its own use cases.

Figure 5:
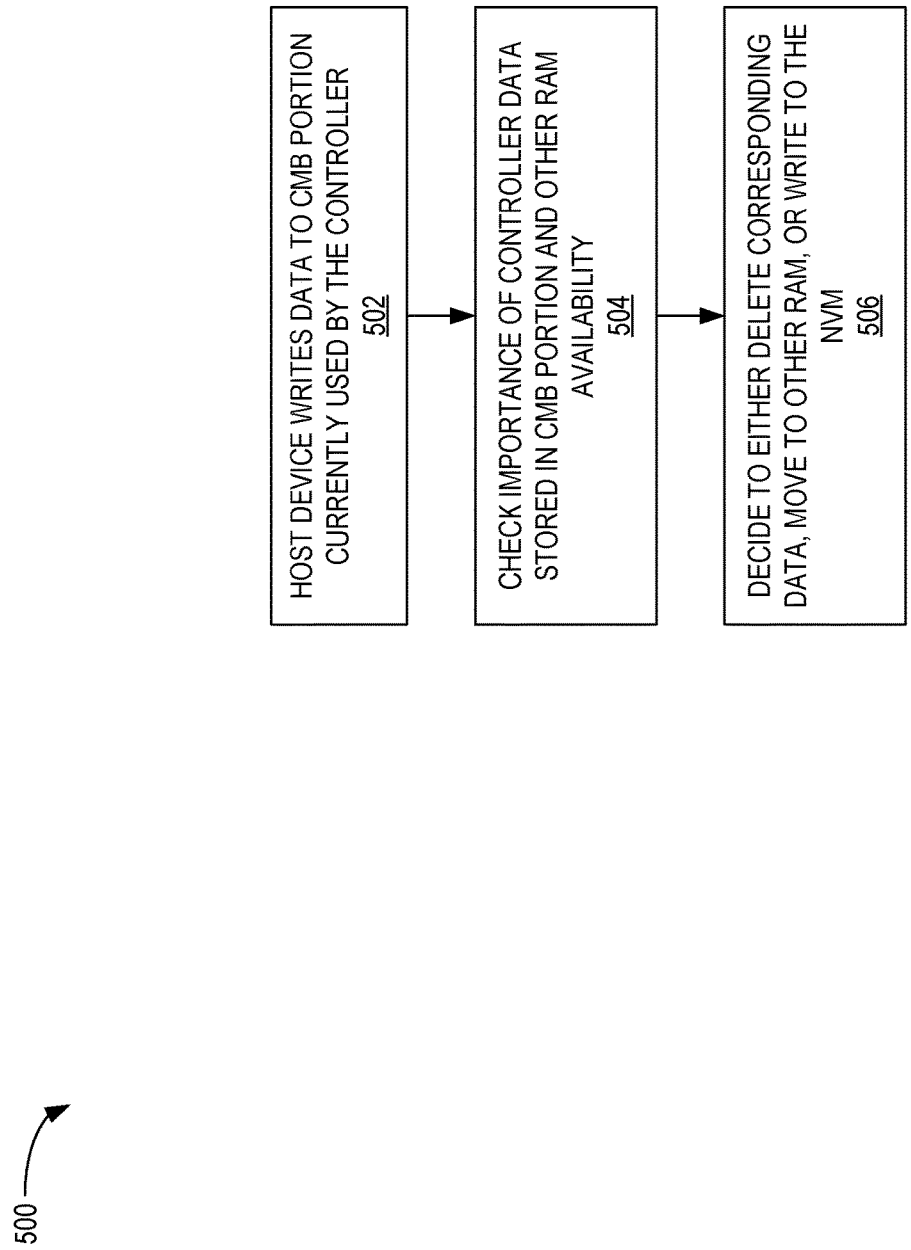
FIG. 5 is a flow diagram illustrating a method of evicting non-host data stored in a CMB, according to certain embodiments.

FIG. 5 is a flow diagram illustrating a method 500 of evicting non-host data stored in a CMB, such as data stored in the excess space of the CMB 312 of FIG. 3, according to certain embodiments. Method 500 may be implemented by a controller, such as the controller 108 of FIG. 1 or the controller 306 of FIG. 3, where the controller includes a CMB allocation module, such as the CMB allocation module 308 of FIG. 3. For exemplary purposes, aspects of the storage system 300 of FIG. 3 may be referenced herein.

At block 502, the host device 302 requests to write data to the CMB 312 portion that is currently utilized by the controller 306. At block 504, the controller 306 checks the importance of the data stored in the CMB 312 portion requested and whether there is available RAM (e.g., volatile memory) outside of the CMB 312 portion, which may be internal to the controller 306 or external to the controller 306, to store the data stored in the CMB 312 portion requested. At block 506, the controller 306 either deletes/erases the non-host data stored in the CMB 312 portion requested, moves the non-host data from the CMB 312 portion to another RAM, where the non-host data is deleted after moving the non-host data to the another RAM, or moves the non-host data from the CMB 312 portion to an NVM, such as the NVM 110 of FIG. 1, where the non-host data is deleted after moving the non-host data to the NVM.

Figure 6:
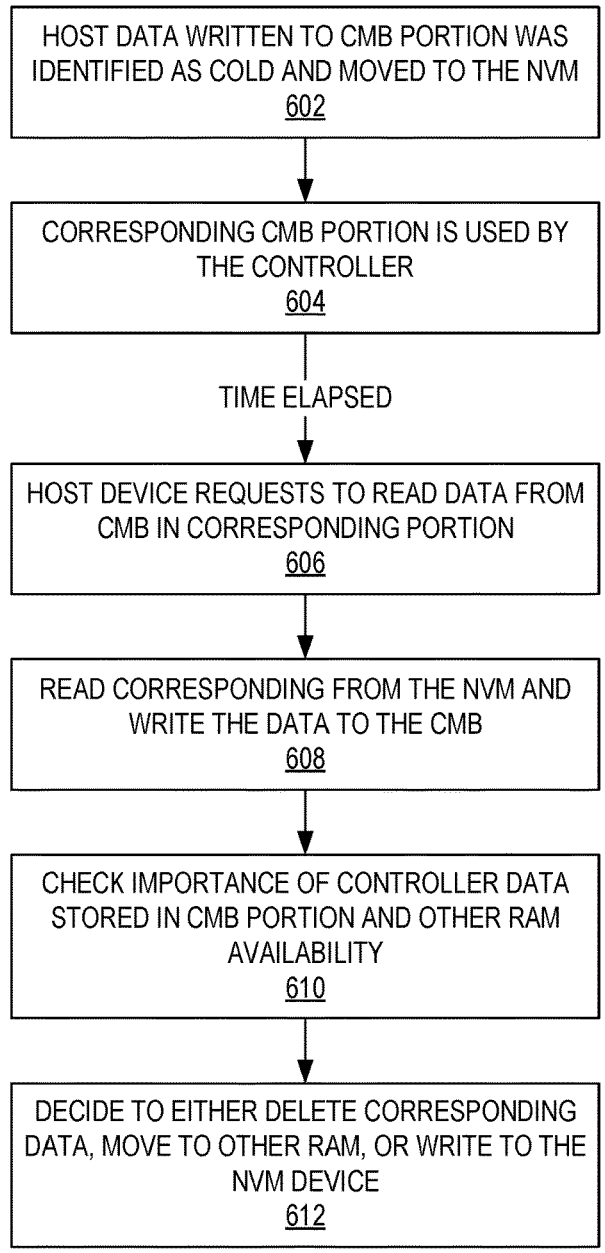
FIG. 6 is a flow diagram illustrating a method of offloading host data from a CMB to a non-volatile memory device, according to certain embodiments.

FIG. 6 is a flow diagram illustrating a method 600 of offloading host data from a CMB, such as the CMB 312 of FIG. 3, to a non-volatile memory device, such as the NVM 110 of FIG. 1, according to certain embodiments. Method 600 may be implemented by a controller, such as the controller 108 of FIG. 1 or the controller 306 of FIG. 3, where the controller includes a CMB allocation module, such as the CMB allocation module 308 of FIG. 3. For exemplary purposes, aspects of the storage system 100 of FIG. 1 and the storage system 300 of FIG. 3 may be referenced herein.

At block 602, host data that is written to a portion of the CMB 312 is identified as cold and moved to the NVM 110. Identifying data as cold may be determined by the controller 306 based on a time since last read, a number of read requests for the data, a likelihood that the data will not be requested for a subsequent period of time, and the like. Furthermore, moving host data to the NVM 110 may further include generating a mapping table specifically for host data moved to the NVM 110 from the CMB 312. At block 604, the corresponding portion of the CMB 312 is used by the controller 306. After some time has elapsed, the host device 302 requests to read the data from the CMB in the corresponding portion at block 606. However, because the host data was identified as cold, the host data was moved to the NVM 110. At block 608, the corresponding data is read from the NVM 110 and programmed back to the CMB 312, which also may include sending the requested host data back to the host device 302. At block 610, the controller 108 checks the importance of controller data stored in the portion of the CMB 312 that is being utilized by the controller 306 to store non-host data as well as other RAM availability. At block 612, the controller 306 either deletes/erases the non-host data stored in the CMB 312 portion, moves the non-host data from the CMB 312 portion to another RAM, where the non-host data is deleted after moving the non-host data to the another RAM, or moves the non-host data from the CMB 312 portion to the NVM 110, where the non-host data is deleted after moving the non-host data to the NVM 110.

By determining an amount of a controller memory buffer allocated to a host device, but not utilized by the host device, and utilizing at least a portion of the amount of the controller memory buffer not utilized by the host device for non-host data by the controller, implementation of the controller memory buffer may be improved, power consumption of the data storage device may be decreased, and performance and quality of service may be improved.

In one embodiment, a data storage device includes a memory device and a controller coupled to the memory device. The controller includes a controller memory buffer (CMB) allocated to a host device for use by the host device. The controller is configured to determine a usage pattern of the CMB by the host device and utilize a portion of the CMB for non-host data based on the usage pattern of the CMB by the host device. The portion of the CMB remains allocated to the host device.

The usage pattern is based on comparing a current workload associated with the CMB and a number of past workloads associated with the CMB. The current workload and the number of past workloads are substantially similar workloads. The controller is further configured to determine the portion of the CMB based on the comparing. The portion of the CMB is an amount of memory of the CMB not utilized by the host device for the current workload. Utilizing the portion of the CMB includes storing cached data in the portion of the CMB. The cached data was previously stored external to the controller. Utilizing the portion of the CMB comprises storing second read look ahead data in the portion of the CMB. First read look ahead data is stored in the controller external to the CMB. Utilizing the portion of the CMB includes storing at least a portion of a relink table in the portion of the CMB. The relink table maps bad blocks of the memory device to good blocks of the memory device. The controller is further configured to determine that at least some of the portion of the CMB is needed for usage by the host device and evict data stored in the portion of the CMB. Evicting the data stored in the portion of the CMB includes either moving the data to a location external to the CMB, where moving the data comprises erasing the data from the portion of the CMB, or erasing the data from the portion of the CMB. The controller is further configured to identify data programmed to the CMB by the host device as cold data, where the cold data is data that is not expected to be read during a subsequent time frame, and move the identified data from the CMB to the memory device. The controller is further configured to determine that the host device is attempting to read the identified data from the CMB and either provide the identified data from the memory device to the host device or move the identified data to the CMB from the memory device and provide the identified data from either the CMB or the memory device to the host device.

In another embodiment, a data storage device includes a memory device and a controller coupled to the memory device. The controller includes a volatile memory device a controller memory buffer (CMB) allocation module. The volatile memory device includes a CMB. The CMB is allocated to a host device for use by the host device. The CMB allocation module is configured to analyze a usage pattern of the CMB, where analyzing the usage pattern of the CMB includes analyzing a number of past workloads of the CMB and a current workload of the CMB, determine whether a portion of the CMB can be used by the controller based on the usage pattern, and notify the controller of the portion of the CMB that can be used by the controller based on the determining. The controller is configured to utilize the portion of the CMB for management data, responsive to the notifying. The portion of the CMB remains allocated to the host device.

The CMB allocation module is further configured to provide the usage pattern to the controller. The portion of the CMB is an amount of memory not utilized by the host device. The portion of the CMB is an area where data is programmed and read once. Utilizing the portion of the CMB occurs after the data has been read once. The management data includes one or more of cached data, read look ahead data, a portion of a relink table, garbage collection data, and exception handling data.

In another embodiment, a data storage device includes first means for storing data and a controller coupled to the first means for storing data. The controller includes second means for storing data. The controller is configured to allocate a portion of the second means for storing data to a host device, determine that the host device is using less than all of the portion of the second means for storing data, and utilize the portion of the second means for storing data not used to store management data.

The second means for storing data is distinct from the first means for storing data. Determining that the host device is using less than all of the portion of the second means for storing data further comprises determining a usage of the second means for storing data for a number of past workloads and a current workload. A size of the portion of the second means for storing data not used is dependent on determining the usage of the second means for storing data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller comprises:
   a volatile memory device, wherein the volatile memory device comprises a controller memory buffer (CMB), wherein the CMB is allocated to a host device for use by the host device; and
   a CMB allocation module, wherein the CMB allocation module is configured to:
   analyze a usage pattern of the CMB, wherein analyzing the usage pattern of the CMB comprises analyzing a number of past workloads of the CMB and a current workload of the CMB;
   determine whether a portion of the CMB can be used by the controller based on the usage pattern; and
   notify the controller of the portion of the CMB that can be used by the controller based on the determining; and
   wherein the controller is configured to:
   utilize the portion of the CMB for management data, responsive to the notifying, wherein the portion of the CMB remains allocated to the host device.

2. The data storage device of claim 1, wherein the CMB allocation module is further configured to provide the usage pattern to the controller.

3. The data storage device of claim 1, wherein the portion of the CMB is an amount of memory not utilized by the host device.

4. The data storage device of claim 1, wherein the portion of the CMB is an area where data is programmed and read once.

5. The data storage device of claim 4, wherein utilizing the portion of the CMB occurs after the data has been read once.

6. The data storage device of claim 1, wherein the management data comprises one or more of:
   cached data;
   read look ahead data;
   a portion of a relink table;
   garbage collection data; and
   exception handling data.

* * * * *